United States Patent
Mueller

(10) Patent No.: US 11,312,411 B2
(45) Date of Patent: Apr. 26, 2022

(54) METHOD FOR TESTING AT LEAST ONE VEHICLE COMPONENT OF A VEHICLE

(71) Applicant: Robert Bosch GmbH, Stuttgart (DE)

(72) Inventor: Florian Mueller, Schorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 16/760,957

(22) PCT Filed: Sep. 24, 2018

(86) PCT No.: PCT/EP2018/075742
§ 371 (c)(1),
(2) Date: May 1, 2020

(87) PCT Pub. No.: WO2019/096468
PCT Pub. Date: May 23, 2019

(65) Prior Publication Data
US 2020/0255060 A1   Aug. 13, 2020

(30) Foreign Application Priority Data

Nov. 15, 2017   (DE) .................. 10 2017 220 327.7

(51) Int. Cl.
*B62D 5/04*   (2006.01)
*B60W 50/02*  (2012.01)
*B62D 1/00*   (2006.01)

(52) U.S. Cl.
CPC ....... *B62D 5/0481* (2013.01); *B60W 50/0205* (2013.01); *B62D 1/00* (2013.01);
(Continued)

(58) Field of Classification Search
None
See application file for complete search history.

(56) References Cited

U.S. PATENT DOCUMENTS

| 6,756,966 B2 * | 6/2004 | Dirksen | B60K 35/00 345/156 |
| 7,590,502 B2 * | 9/2009 | Obata | B62D 5/0457 702/113 |

(Continued)

FOREIGN PATENT DOCUMENTS

| CN | 102829980 A | 12/2012 |
| DE | 40 15 773 A1 | 11/1990 |

(Continued)

OTHER PUBLICATIONS

International Search Report corresponding to PCT Application No. PCT/EP2018/075742, dated Dec. 20, 2018 (German and English language document) (5 pages).

*Primary Examiner* — Kevin R Steckbauer
(74) *Attorney, Agent, or Firm* — Maginot, Moore & Beck LLP

(57) ABSTRACT

A method for testing at least one vehicle component of a vehicle includes placing a steering system of the vehicle in at least one test operating state, the steering system including a control unit which is at least one of electrically and electronically connected to a steering input unit to provide a steering torque in a normal operating state. The method further includes actuating an actuator of the steering system in the at least one operating state to carry out at least one driving maneuver to test the at least one vehicle component without an active steering demand on a manual steering control of the steering input unit.

16 Claims, 2 Drawing Sheets

(52) U.S. Cl.
    CPC ....... *B62D 5/046* (2013.01); *B60W 2050/021* (2013.01); *B60W 2050/022* (2013.01)

(56) References Cited

U.S. PATENT DOCUMENTS

| | | | |
|---|---|---|---|
| 9,452,776 B1* | 9/2016 | Hwa | B62D 5/0481 |
| 9,776,657 B1* | 10/2017 | Badiru | B62D 6/10 |
| 2002/0041273 A1* | 4/2002 | Dirksen | G06F 3/0354 |
| | | | 345/173 |
| 2006/0158031 A1* | 7/2006 | Kummel | B60T 8/241 |
| | | | 303/146 |
| 2008/0243399 A1* | 10/2008 | Obata | B62D 5/0457 |
| | | | 702/41 |
| 2019/0225235 A1* | 7/2019 | Schyr | G01M 17/007 |
| 2020/0255060 A1* | 8/2020 | Mueller | B60W 50/0205 |

FOREIGN PATENT DOCUMENTS

| | | |
|---|---|---|
| DE | 20 2011 050 806 U1 | 12/2011 |
| DE | 10 2015 207 486 A1 | 10/2016 |
| DE | 10 2017 117 327 A1 | 2/2018 |
| EP | 1 972 524 A2 | 9/2008 |
| JP | 2005-212706 A | 8/2005 |
| JP | 2006-131052 A | 5/2006 |
| JP | 2006-518302 A | 8/2006 |
| JP | 2008-126839 A | 6/2008 |
| JP | 2008-232724 A | 10/2008 |
| JP | 2010-89698 A | 4/2010 |
| JP | 2015-193329 A | 11/2015 |
| WO | 2018/046609 A1 | 3/2018 |

\* cited by examiner

METHOD FOR TESTING AT LEAST ONE VEHICLE COMPONENT OF A VEHICLE

This application is a 35 U.S.C. § 371 National Stage Application of PCT/EP2018/075742, filed on Sep. 24, 2018, which claims the benefit of priority to Serial No. DE 10 2017 220 327.7, filed on Nov. 15, 2017 in Germany, the disclosures of which are incorporated herein by reference in their entirety.

BACKGROUND

The disclosure is based on a method for testing at least one vehicle component of a vehicle and on a vehicle. In addition, the disclosure relates to a control unit and a system.

From the prior art, vehicles are known which have a steering system with a manual steering control, a steering gear and a steering column for the mechanical connection of the manual steering control to the steering gear. Furthermore, the steering system may have an electric steering assistance which comprises an actuator unit in the form of an electric motor and is provided to provide, in a normal operating state, a steering torque to support a manual torque applied to the manual steering control.

Moreover, vehicles with steer-by-wire steering systems are known which do not have a direct mechanical connection between a manual steering control and steered vehicle wheels, and in which a steering command on the manual steering control is forwarded exclusively electrically. Also in this case, the steering system comprises an actuator unit in the form of an electric motor, in particular operatively connected to the steerable vehicle wheels of the vehicle, which is provided to provide a steering torque to adjust a rack or a steering control element in a normal operating state and thereby to transmit the steering command to the vehicle wheels.

In order to approve a driving dynamics control software and/or to tune a chassis of the vehicle, it is also known to perform various driving maneuvers, such as a sudden lane change, in a test operating state for testing the driving dynamics control software and/or the chassis. For this purpose, a special steering robot is installed in the vehicle in the test operating state and is connected to the manual steering control in such a way that the steering robot at least partially replaces a driver and transmits the steering commands required for the driving maneuver to the manual steering control. However, the installation and removal of the steering robot is very complex and time-consuming.

On this basis, the object of the disclosure consists in particular of a method for testing at least one vehicle component of a vehicle and/or in providing a vehicle with improved efficiency characteristics. The object is achieved by the embodiments and developments of the disclosure.

SUMMARY

The disclosure is based on a method for testing, in particular for adjusting, tuning and/or approving, at least one vehicle component of a vehicle, in particular a motor vehicle, wherein the vehicle comprises a steering system with an at least partially electrically and/or electronically formed actuator unit, which is provided to provide a steering torque in a normal operating state, and wherein a driving maneuver, such as a sudden lane change, a so-called "sine-dwell" maneuver, a so-called "fishhook" maneuver, a so-called "J-turn" maneuver and/or a so-called "U-turn" maneuver, is carried out in at least one test operating state for testing the vehicle component.

It is proposed that the driving maneuver is carried out by the actuator unit, advantageously fully automatically and/or at least partially automatically and in particular without an active steering demand on a manual steering control. In particular, this design can improve efficiency, in particular test efficiency, time efficiency, component efficiency and/or cost efficiency. In particular, a complex and time-consuming installation and removal of a steering robot can be advantageously dispensed with thereby. Also, the existing and currently used actuator units usually have sufficient power to automatically control a direction of travel of the vehicle and perform the corresponding driving maneuver, so that existing assemblies can be used and thus in particular additional costs for testing the vehicle components can be minimized.

In the present case, the vehicle and/or the steering system may in particular also comprise the at least one vehicle component and/or at least one computing unit, which is provided in particular to carry out the procedure for testing the vehicle component. In addition, the vehicle and/or the steering system may comprise further components and/or assemblies, such as for example a control unit, at least one manual steering control for applying a manual torque and/or at least one wheel steering angle actuator, which advantageously has at least one steering control element, for example in the form of a rack. In particular, the steering system may also be designed as a conventional steering system or as a steer-by-wire steering system. The conventional steering system has in particular a direct mechanical connection between the manual steering control and the wheel steering angle actuator, which is designed in particular as a steering gear. In particular in at least one operating state, the steer-by-wire steering system is free of a direct mechanical connection between the manual steering control and the wheel steering angle actuator, which is also referred to as the "steering rack actuator".

Further, an "actuator unit" should be understood in particular to mean a unit, in particular operatively connected to the steerable vehicle wheels of the vehicle, which advantageously has a direct operative connection to the steering control element and in particular is provided to transmit a steering torque to the steering control element and thereby advantageously influence a direction of travel of the vehicle. Preferably, the actuator unit is provided to provide a steering torque in the normal operating state to support a manual torque applied to the manual steering control or for in particular direct adjustment of the steering control element and thereby in particular for direct control of a direction of travel of the vehicle. Furthermore, the actuator unit is provided in particular to automatically control a direction of travel of the vehicle in the test operating state and in particular to provide and/or implement the steering commands required for the driving maneuver and to advantageously transfer them directly to the steering control element. For this purpose, the actuator unit may comprise at least one actuator. The actuator is advantageously designed as an electric motor, in particular as a brushless motor and advantageously as an asynchronous motor or as a permanently excited synchronous motor. In particular, the actuator unit may also comprise multiple actuators. Preferably, the actuator unit is also designed as part of the wheel steering angle actuator. In particular, "provided" should be understood to mean specially programmed, designed and/or equipped. By the fact that an object is provided for a certain function, it should be understood in particular that the object fulfills and/or executes this particular function in at least one application state and/or operating state.

Furthermore, a "computing unit" is to be understood in particular to be an electronic unit, which has an information input, information processing and an information output. Advantageously, the computing unit further has at least one processor, at least one memory, at least one input and/or output means, at least one operating program, at least one control routine, at least one regulating routine, at least one calculation routine and/or at least one test routine. Preferably, the computing unit also comprises at least one operating software associated with a normal operating mode and/or at least one test software associated with a test operating mode. Preferably, the computing unit is further integrated into the control unit of the vehicle. A "normal operating state" shall in particular be understood to mean an operating state which is active and/or used in normal operation and/or driving of the vehicle, in particular on public roads and in particular when the vehicle is being operated by an end-user. Furthermore, a "normal operating mode" should be understood in particular to be an operating mode of the actuator unit, which is active and/or is used in the normal operating state. A "test operating state" should be understood in particular to be a different operating state from the normal operating state, which is advantageously exclusively used for testing, in particular for adjustment, for tuning and/or for approval of the vehicle component, and which is particularly advantageously carried out on a closed test site. A "test operating mode" should in particular be understood to be a different operating mode of the actuator unit from the normal operating mode, which, advantageously exclusively, is provided for testing the vehicle component in the test operating state.

According to an advantageous embodiment of the disclosure, it is proposed that the vehicle component is a vehicle software, in particular a driving dynamics control system, an in particular mechanical steering component of the steering system, such as the wheel steering angle actuator or the steering control element, and/or a chassis of the vehicle. In this way, safety-critical vehicle components in particular can be advantageously easily tested and/or matched to each other.

Advantageously, it is also proposed that the driving maneuver is carried out automatically, in particular fully automatically and/or at least partially automatically, wherein at least one actuator of the actuator unit, in particular the already aforementioned actuator, which is provided for direct influence of a direction of travel of the vehicle, at least in the test operating state, is controlled by a control unit of the vehicle, in particular the control unit already previously mentioned. In particular, advantageously automated and/or efficient execution of a driving maneuver can be achieved in this way.

According to a further embodiment of the disclosure, it is proposed that the actuator unit is placed in a special test operating mode in the test operating state, in which at least one operating function blocked in a normal operating mode is accessible and/or a limitation of at least one operating function limited in a normal operating mode is removed. Preferably, in the test operating mode at least a limitation of a maximum steering torque and/or of an in particular speed-dependent steering gradient is removed. Moreover, the test operating mode is particularly preferably not accessible in the normal operating state for control technology and/or regulation technology purposes. That the "test operating mode is particularly preferably not accessible in the normal operating state for control technology and/or regulation technology purposes" is to be understood in particular to mean that in the normal operating state the test operating mode is switched off, in particular functionally and/or structurally, cannot be controlled, is unreachable and/or inexecutable and is therefore in particular not executed and/or not executable in the normal operating state. In particular, this can improve operational safety and/or comply with legal requirements in a normal operating state.

In a preferred embodiment of the disclosure it is proposed that in the test operating state an operating software associated with a normal operating mode is replaced by a test software associated with a test operating mode. Preferably, the operating software associated with the normal operating mode is overwritten with the test software. In this way resources, in particular memory resources, that are especially needed in the normal operating state, can be minimized. In addition, operational safety can be further increased, since access to the test software is not possible in the normal operating state.

Moreover, it is proposed that an operating software associated with a normal operating mode, in particular permanently, is stored in a first memory area of an operating memory of the vehicle and a test software associated with a test operating mode, in particular permanently, is stored in a second memory area of the operating memory that is separate from the first memory area and protected from the first memory area. In particular, the operating memory may correspond to the memory of the computing unit or be in the form of another memory of the vehicle. Preferably, the memory areas are physically and/or logically separated from each other in this case. In particular, in this way test efficiency and/or time efficiency can be further improved, as a software change can advantageously be dispensed with.

Furthermore, it is proposed that the actuator unit has an operative connection to at least one user interface, which is provided for coupling to at least one external electronic device, such as a computer, a notebook, a tablet, a smartphone and/or a comparable electronic device, wherein for testing the vehicle component at least one test parameter is set via the user interface and using the external electronic device. In particular, the actuator unit is provided to take into account and/or use the test parameter when carrying out the driving maneuver. The test parameter can be advantageously associated with a driving maneuver to be carried out and can be used, for example, for selection of the driving maneuver and/or for defining a sequence of steering commands, which are required for the driving maneuver. Alternatively or additionally, the test parameter may correspond, for example, to a predeterminable vehicle speed and/or a maximum steering torque. Furthermore, the user interface can be advantageously designed as a mechanical communication interface, in particular as a diagnostic interface, for example as an OBD2 jack, and/or as a wireless communication interface, in particular as a wireless interface, for example by using a Bluetooth standard, a mobile phone standard, a WLAN standard and/or a comparable radio standard. In particular, the vehicle may have the user interface. In particular, control of a test operation can be simplified in this way.

In addition, the disclosure is based on a vehicle, in particular a motor vehicle, which is provided in particular to carry out the aforementioned method, with at least one vehicle component to be tested and with a steering system, which comprises an at least partially electrically and/or electronically formed actuator unit, which is provided to provide a steering torque in a normal operating state.

It is proposed that in at least one test operating state for testing, in particular for adjustment, tuning and/or approval, of the vehicle component, the actuator unit is provided to carry out at least one driving maneuver, such as a sudden lane change, a so-called "sine-dwell" maneuver, a so-called "fishhook" maneuver, a so-called "J-turn" maneuver and/or a so-called "U-turn" maneuver, advantageously fully automatically and/or at least partially automatically and in particular without an active steering demand on a manual steering control. In particular, this can improve efficiency, in particular test efficiency, time efficiency, component efficiency and/or cost efficiency. In particular, a complex and time-consuming installation and removal of a steering robot can be advantageously dispensed with in this way. Also, the existing and currently used actuator units usually have sufficient power to automatically control a direction of travel of the vehicle and perform the corresponding driving maneuver, so that existing assemblies can be used and thus in particular additional costs for testing the vehicle components can be minimized.

Advantageously, the steering system is designed as a steer-by-wire steering system, whereby in particular at least for steering systems in which a steering command is forwarded exclusively electrically, an additional steering robot can be dispensed with.

Moreover, it is proposed that the vehicle comprises at least one user interface operatively connected to the actuator unit, in particular the user interface already mentioned above, which is provided for coupling to at least one external electronic device, in particular the external electronic device already mentioned above. In this way, in particular control of a test process can be simplified.

Furthermore, the disclosure relates to a system with the aforementioned vehicle and with the external electronic device, which is provided for coupling to the user interface. Preferably, in this case the external electronic device is provided for wireless coupling to the user interface. Moreover, the external electronic device particularly advantageously comprises an interface unit, which is provided to provide a management environment for setting at least one test parameter, in particular the test parameter already mentioned above. An "interface unit" shall be understood to mean in particular a part, in particular a subassembly, an electronic device, which allows a user at least access to a database with adjustable and/or selectable test parameters and/or an interaction possibility with a test controller. In particular, the interface unit for this comprises an operating unit, which may be provided, for example, for a gesture input and/or a gesture control, a voice input and/or a voice control and/or a touch input and/or a touch control, and/or a display unit for displaying the management environment. A "management environment" shall in particular be understood to mean an in particular virtual working environment and/or an in particular virtual working area, which is provided in particular for management, advantageously at least for setting and/or selection, of at least one test parameter. Advantageously, the management environment can be part of an associated software program and/or an associated application. In particular, in this way efficiency can be improved and/or advantageously simple control of the test process can be achieved.

The method for testing the vehicle component, the vehicle and the system shall not be limited to the application and embodiment described above. In particular, the method for testing the vehicle component, the vehicle and the system for fulfilling a functionality described herein may have a number different from a number of individual elements, components and units described herein.

BRIEF DESCRIPTION OF THE DRAWINGS

Further advantages arise from the following drawing description. An exemplary embodiment of the disclosure is illustrated in the drawings. The drawings, the description and the disclosure contain numerous features in combination. The person skilled in the art will also appropriately consider the features individually and combine them into meaningful further combinations.

In the figures.

DETAILED DESCRIPTION

Figure 1A:
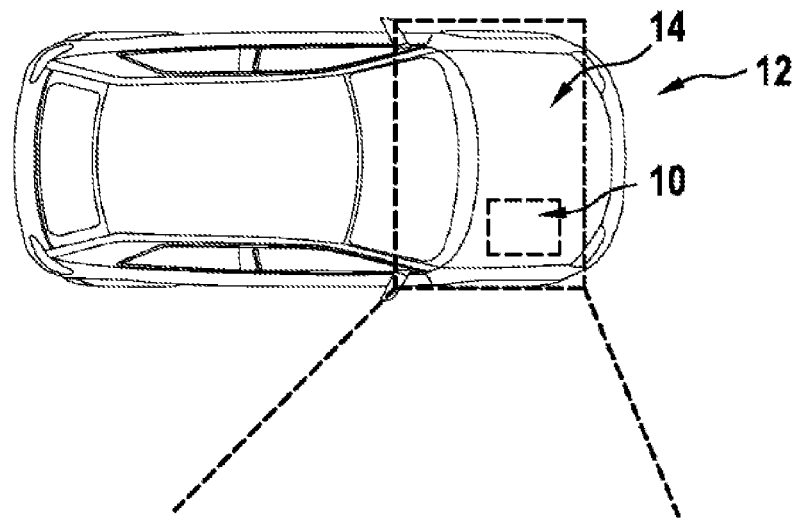
FIGS. 1a-b show a vehicle with a steering system designed as a steer-by-wire steering system by way of example in a simplified representation.
Figure 1B:
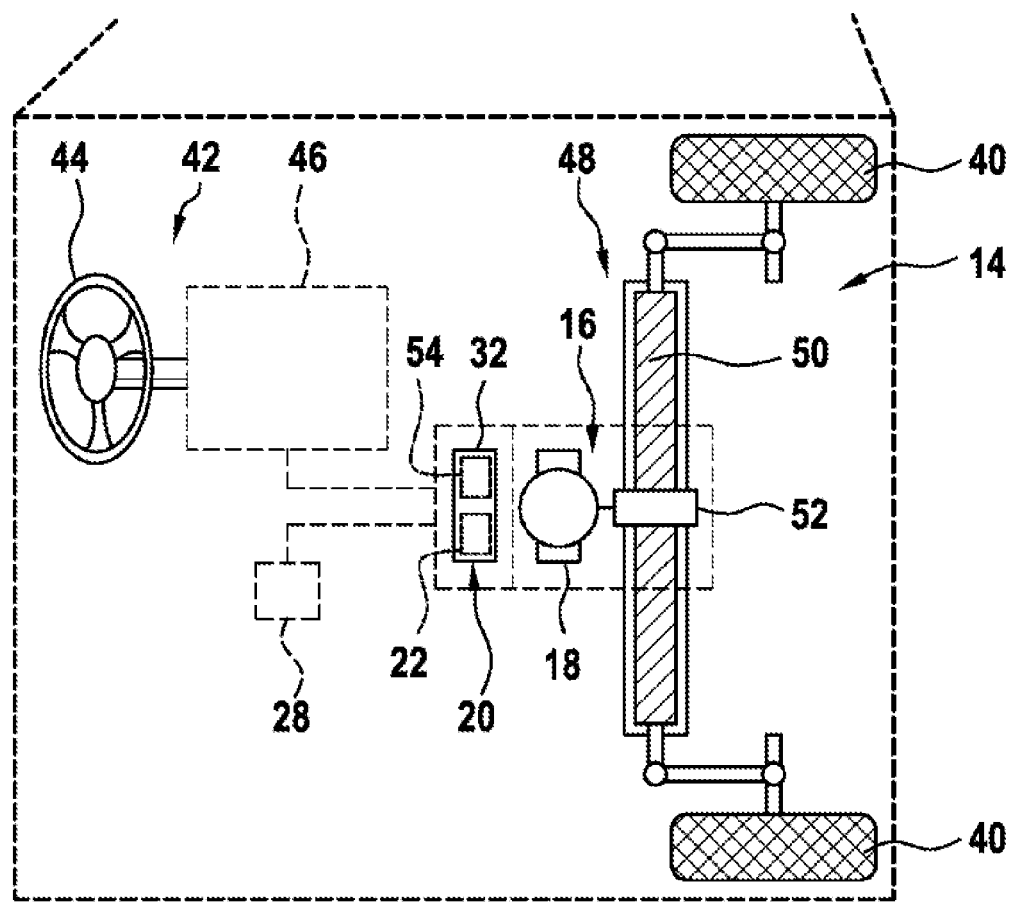

FIGS. 1a and 1b show a vehicle 12 by way of example as a passenger car with multiple vehicle wheels 40 and with a steering system 14 in a simplified representation. The steering system 14 has an operative connection to the vehicle wheels 40 and is provided to influence a direction of travel of the vehicle 12. Furthermore, in the present case the steering system 14 is designed as a steer-by-wire steering system, in which in at least one operating state a steering command is forwarded exclusively electrically to the vehicle wheels 40. Alternatively, a steering system could also be designed as a conventional steering system with a mechanical feedthrough.

The steering system 14 has a known steering input unit 42, which comprises at least one manual steering control 44, for example in the form of a steering wheel, and a steering function unit 46, which is also referred to as a "steering wheel actuator". The steering function unit is provided to capture signals, forces and/or moments from the manual steering control 44, in particular directly, and/or to transmit the signals to the manual steering control 44, in particular directly. In the present case, the steering function unit 46 is provided on the one hand for capturing steering angle information from the manual steering control 44 and on the other hand for generating a steering resistance and/or a restoring torque on the manual steering control 44. Alternatively, a manual steering control could also be in the form of a steering lever and/or a steering ball or the like. Also, in principle the steering system could be free of a steering input unit, for example in the case of an autonomously driving vehicle.

The steering system 14 also comprises a wheel steering angle actuator 48, which is also referred to as a "steering rack actuator" in the present case. The wheel steering angle actuator 48 is purely electrically connected to the steering input unit 42. The wheel steering angle actuator 48 is designed as a rack-and-pinion steering gear. The wheel steering angle actuator 48 has an operative connection to at least two of the vehicle wheels 40, in particular two front wheels. The wheel steering angle actuator 48 is provided to cause a swiveling movement and/or a rotational movement of the vehicle wheels 40 and in particular to convert a steering demand into a steering movement of the vehicle wheels 40.

For this purpose, the wheel steering angle actuator 48 comprises a steering control element 50. The steering control element 50 is supported so as to be movable in an axial direction. The steering control element 50 is in the form of a rack in the present case. The steering control element 50 is provided for adjusting a wheel angle of the vehicle wheels 40, in particular in the form of front wheels.

Moreover, the wheel steering angle actuator 48 comprises an actuator unit 16. The actuator unit 16 is of an at least partially electrical and/or electronic form. The actuator unit 16 has an operative connection to the steering control element 50. The actuator unit 16 is provided to provide a steering torque and to transfer this to the steering control element 50. In the present case, the actuator unit 16 is provided to provide a steering torque in a normal operating state for in particular direct adjustment of the steering control element 50 and thereby in particular for direct control of a direction of travel of the vehicle 12.

For this purpose, the actuator unit 16 comprises at least one actuator 18. The actuator 18 is in the form of an electric motor, in the present case in particular as a permanently excited synchronous motor. The actuator 18 is provided for generating the steering torque.

For coupling the actuator 18 to the steering control element 50, the actuator unit 16 further comprises a coupling transmission 52. The coupling transmission 52 can be in the form of a belt transmission or a chain transmission with a drive pinion, for example. The coupling transmission 52 is provided to transfer a steering torque of the actuator 18 to the steering control element 50 in order to cause an adjustment of the steering control element 50. In principle, however, it is also conceivable to dispense with a coupling transmission and to directly couple an actuator to a steering control element. In addition, an actuator unit could also be part of an electrical auxiliary force steering system and, in particular, could be provided for the generation and/or provision of an electrical steering assistance or part of an electrical overlay steering and/or external force steering and in particular for the generation and/or provision of an additional steering angle and/or a variable steering ratio.

Moreover, the steering system 14 has a control unit 20. In the present case, the control unit 20 is part of the wheel steering angle actuator 48 and in particular is directly coupled to the actuator unit 16. In this case, the control unit 20 and the actuator unit 16 form a common assembly, a so-called "powerpack". The control unit 20 also has an operative connection to the steering input unit 42. The control unit 20 is at least provided to control the actuator unit 16 in a normal operating state depending on a signal of the steering input unit 42.

For this purpose, the control unit 20 comprises a computing unit 32. The computing unit 32 comprises at least one processor 54, for example in the form of a microprocessor, and at least one operating memory 22. In addition, the computing unit 32 comprises at least one operating software stored in the operating memory and associated with a normal operating mode. The operating software comprises an operating program with at least one calculation routine, at least one control routine and at least one regulating routine. In principle, however, it is also conceivable to embody a control unit separately from an actuator unit. In this context, a control unit could also be assigned to a steering input unit, for example. In addition, a steering system and/or a vehicle could also have a single central control unit with a central computing unit. In addition, an operating software could also be stored on another operating memory of the vehicle.

Furthermore, the vehicle 12 has a user interface 28. In the present case, the user interface 28 is in the form of a wireless communication interface, in particular as a radio interface. The user interface 28 is provided for coupling to at least one external electronic device 30, which in the present case is in the form of a notebook by way of example (cf. also FIG. 2). The user interface 28 is in particular in the form of a protected user interface, advantageously such that an end user has no direct access and/or only limited access to the user interface 28. Furthermore, the user interface 28 has an operative connection to the actuator unit 16 and/or the control unit 20. In the present case, the user interface 28 grants access to the actuator unit 16, in particular for controlling the actuator unit 16 and/or the control unit 20, in particular for adjusting the operating memory 22 of the control unit 20. Alternatively, however, a user interface could also be in the form of a mechanical communication interface, such as an OBD2 jack. In addition, it is conceivable to completely dispense with a user interface.

For testing at least one vehicle component 10, such as a vehicle software of a driving dynamics control system and/or of a chassis, in a test operating state at least one driving maneuver, such as a sudden lane change, a "sine-dwell" maneuver, a "fishhook" maneuver, a "J-turn" maneuver and/or a "U-turn" maneuver, is carried out by the actuator unit 16 fully automatically and/or at least partially automatically and in particular without an active steering demand on the manual steering control 44, so that advantageously the complex and time-consuming installation and removal of a steering robot can be dispensed with.

For this purpose, in the test operating state the actuator unit 16 is placed in a special test operating mode, in which at least one operating function that is blocked in a normal operating mode is accessible and/or a limitation of at least one operating function that is limited in a normal operating mode is removed. In the present case, at least a limitation of a maximum steering torque and/or of an in particular speed-dependent steering gradient is removed.

In the present case, in the test operating state, in addition the operating software associated with the normal operating mode, which in the present case is stored in particular in the operating memory 22, is replaced by a test software associated with a test operating mode. The operating software will be advantageously completely overwritten by the test software, whereby particularly high operational reliability can be achieved. Alternatively, however, the operating software may also be stored in a first memory area of the operating memory 22 and the test software in a second memory area of the operating memory 22 that is separate from the first memory area and protected from the first memory area. In the latter case, it is conceivable, for example, to select a software to be used, in particular the operating software and/or the test software, via the user interface 28 and using an appropriate authorization. The test software comprises an operating program with at least one calculation routine, at least one control routine, at least one regulating routine and at least one test routine.

By means of the test software, the driving maneuver is then carried out automatically, in particular fully automatically and/or at least partly automatically, wherein the actuator 18 of the actuator unit 16, which is provided for directly influencing a direction of travel of the vehicle 12 at least in the test operating state, is directly controlled by the control unit 20.

Moreover, for testing the vehicle component 10 at least one test parameter can be set via the user interface 28 and using the external electronic device 30. The test parameter is associated with a driving maneuver to be carried out. In the present case, the test parameter is provided for the selection of the driving maneuver and/or a sequence of steering commands, which are required for the driving maneuver. In addition, a vehicle speed and/or a maximum steering torque can be specified by the test parameter.

Alternatively, it is conceivable that an operating function that is blocked in a normal operating mode and/or a limitation of at least one operating function that is limited in a normal operating mode may only be removed in a test operating state, and in this case a change between an operating software used in a normal operating state and a test software can be dispensed with. In addition, it is conceivable to use an external electronic device for vehicle control in a test operating state and thus in particular for direct control of an actuator unit, in particular of an actuator. Furthermore, the selection of at least one test parameter could in principle also be carried out fully automatically by means of a control unit of the vehicle.

Figure 2:
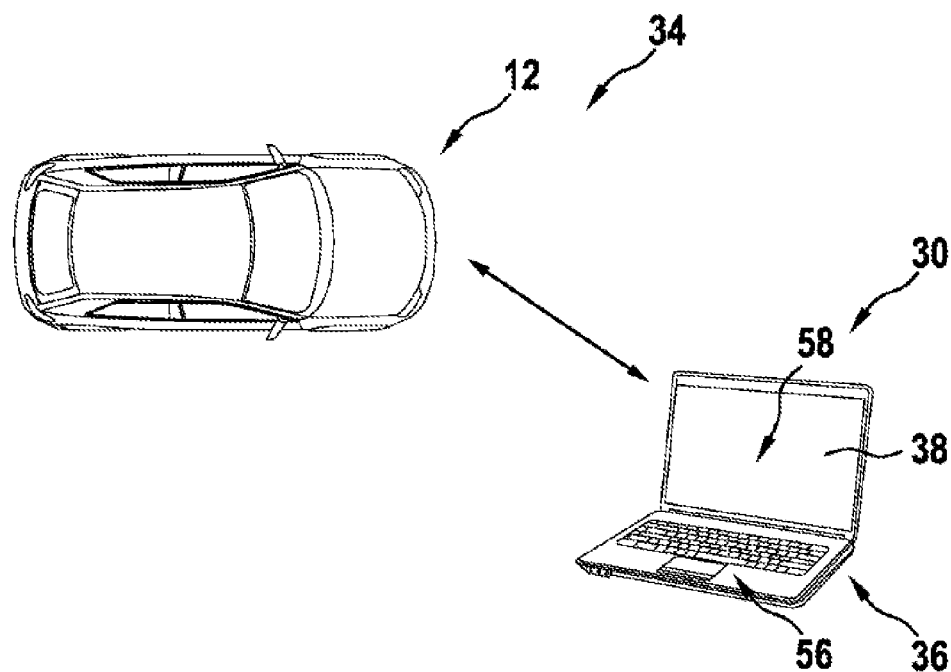
FIG. 2 shows a system comprising the vehicle and an external electronic device and FIG. 3 shows an exemplary flow diagram with main method steps of a method for testing at least one vehicle component of the vehicle.

FIG. 2 shows a system 34 comprising the vehicle 12 and the external electronic device 30.

The external electronic device 30 is provided for coupling to the user interface 28 of the vehicle 12 and in the present case is in the form of a notebook by way of example. In the present case, the external electronic device 30 is provided for wireless coupling to the user interface 28, for example using a Bluetooth standard, a mobile phone standard and/or a WLAN standard.

In addition, the external electronic device 30 is provided for setting the test parameter. For this purpose, the external electronic device 30 comprises an interface unit 36. The interface unit 36 has a data connection to a database (not shown) with adjustable and/or selectable test parameters. The interface Unit 36 is provided to provide a management environment 38. In this case, the management environment 38 is part of an associated software program and/or an associated application. The management environment 38 is used to set and/or select at least one test parameter from the database, in particular from a plurality of predefined test parameters.

For this purpose, the interface unit 36 comprises an operating unit 56. The operating unit 56 is provided for a touch input and/or a touch control. In the present case the operating unit 56 is in the form of a mouse-keyboard input unit. Furthermore, the interface unit 36 has a display unit 58. The display unit 58 is provided for displaying the management environment 38 in at least one operating state.

Figure 3:
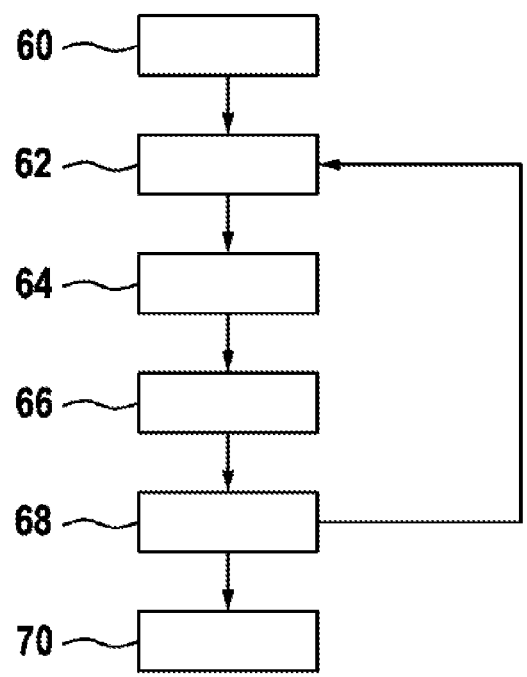

FIG. 3 shows an exemplary flow diagram of a method for testing the vehicle component 10, wherein the computing unit 32 is provided to carry out the method and for this purpose has in particular a computer program with corresponding program code means.

In a step 60 of the method, the operating software associated with the normal operating mode, which is stored in particular in the operating memory 22 in the present case, is replaced by the test software associated with the test operating mode and the actuator unit 16 is placed in a special test operating mode.

In a step 62 of the method at least one test parameter is set via the user interface 28 and using the external electronic device 30 and at least one driving maneuver to be performed is selected.

In a step 64 of the method, the previously selected driving maneuver is carried out by the actuator unit without an active steering demand on the manual steering control 44 to test the vehicle component 10.

In a step 66 of the method, data collected during the test process are evaluated for assessing the vehicle component 10.

In a step 68 of the method, it is checked whether the vehicle component 10 to be tested meets defined and/or definable target specifications.

Then the test of the vehicle component 10 is either terminated, which corresponds to a step 70 of the method, or it continues and step 62 of the method is carried out again, so that at least one test parameter can be varied.

The invention claimed is:

1. A method for testing at least one vehicle component of a vehicle, comprising:
   placing a steering system of the vehicle in at least one test operating state, the steering system including a control unit which is at least one of electrically and electronically connected to a steering input unit to provide a steering torque in a normal operating state; and
   using an actuator unit of the steering system in the at least one test operating state to carry out at least one driving maneuver to test the at least one vehicle component without an active steering demand on a manual steering control of the steering input unit,
   wherein the at least one driving maneuver is selected from the group consisting of at least one sudden lane change, a sine-dwell maneuver, a fishhook maneuver, a J-turn maneuver, and a U-turn maneuver, and
   wherein the vehicle is in motion during the at least one driving maneuver.

2. The method as claimed in claim 1, wherein using the actuator unit of the steering system in the at least one test operating state to carry out the at least one driving maneuver to test the at least one vehicle component comprises:
   using the actuator unit of the steering system in the at least one test operating state to carry out the at least one driving maneuver to test the at least one vehicle component selected from the group consisting of a vehicle software, a steering component of the steering system, and a chassis.

3. The method as claimed in claim 1, wherein using the actuator unit of the steering system comprises:
   using a control unit of the vehicle to automatically control at least one actuator of the actuator unit which is provided for direct influencing a direction of travel of the vehicle in the at least one test operating state.

4. The method as claimed in claim 1, wherein placing the steering system of the vehicle in the at least one test operating state comprises:
   placing the actuator unit in a special test operating mode in which at least one operating function that is blocked in a normal operating mode is accessible.

5. The method as claimed in claim 1, wherein placing the steering system of the vehicle in the at least one test operating state comprises:
   replacing an operating software associated with a normal operating mode with a test software associated with at least one test operating mode.

6. The method as claimed in claim 1, wherein placing the steering system of the vehicle in the at least one test operating state comprises:
   shifting from execution of an operating software, permanently stored in a first memory area of an operating memory of the vehicle and associated with a normal operating mode, to execution of a test software associated with a test operating mode and stored in a second memory area of the operating memory that is separated from the first memory area and protected from the first memory area.

7. The method as claimed in claim 1, further comprising:
coupling at least one external electronic device to the actuator unit through an interface; and
setting at least one test parameter for testing the at least one vehicle component via the interface using the at least one external electronic device.

8. A vehicle with a steering system, comprising:
a steering input unit of the steering system including a manual steering control; and
an actuator unit of the steering system configured to provide a steering torque in a normal operating state, the actuator unit including a control unit which is at least one of electrically and electronically connected to the steering input unit,
wherein the steering system is configured to be placed in at least one test operating state in which the actuator unit carries out at least one driving maneuver to test at least one vehicle component without an active steering demand on the manual steering control,
wherein the at least one driving maneuver is selected from the group consisting of at least one sudden lane change, a sine-dwell maneuver, a fishhook maneuver, a J-turn maneuver, and a U-turn maneuver, and
wherein the vehicle is in motion during the at least one driving maneuver.

9. The vehicle as claimed in claim 8, wherein the steering system is a steer-by-wire steering system.

10. The vehicle as claimed in claim 8, further comprising:
at least one interface operably connected to the actuator unit and configured to couple with at least one external electronic device.

11. A vehicle system, comprising:
a vehicle;
a steering system of the vehicle including:
   a steering input unit including a manual steering control,
   an actuator unit configured to provide a steering torque in a normal operating state, the actuator unit including a control unit which is at least one of electrically and electronically connected to the steering input unit, and
   at least one interface operably connected to the actuator unit; and
   an external electronic device configured to couple with the at least one interface,
wherein the steering system is configured to be placed in at least one test operating state in which the actuator unit carries out at least one driving maneuver to test at least one vehicle component without an active steering demand on the manual steering control,
wherein placing the steering system in the at least one test operating state comprises shifting from execution of an operating software, permanently stored in a first memory area of an operating memory of the vehicle and associated with a normal operating mode, to execution of a test software associated with a test operating mode and stored in a second memory area of the operating memory that is separated from the first memory area and protected from the first memory area, and
wherein the vehicle is in motion during the at least one driving maneuver.

12. The system as claimed in claim 11, wherein the external electronic device is configured to couple wirelessly with the at least one interface.

13. The system as claimed in claim 11, wherein the external electronic device comprises an interface unit configured to provide a management environment for setting at least one test parameter.

14. The vehicle system of claim 11, the control unit further comprising:
a memory including program instructions; and
at least one processor operably connected to the memory, the at least one processor configured to execute the program instructions to place the steering system in the at least one test operating state.

15. The method as claimed in claim 1, wherein placing the steering system of the vehicle in at least one test operating state comprises:
placing the actuator unit in a special test operating mode in which a limitation of at least one operating function that is limited in a normal operating mode is removed.

16. The vehicle of claim 8, the control unit further comprising:
a memory including program instructions; and
at least one processor operably connected to the memory, the at least one processor configured to execute the program instructions to place the steering system in the at least one test operating state.

* * * * *